(12) United States Patent
Scott

(10) Patent No.: US 10,627,037 B2
(45) Date of Patent: Apr. 21, 2020

(54) DEVICES, SYSTEMS, AND METHODS FOR LOCKING A CONDUIT

(71) Applicant: Barry M. Scott, Walkersville, MD (US)

(72) Inventor: Barry M. Scott, Walkersville, MD (US)

( * ) Notice: Subject to any disclaimer, the term of this patent is extended or adjusted under 35 U.S.C. 154(b) by 0 days.

(21) Appl. No.: 16/487,569

(22) PCT Filed: Feb. 21, 2018

(86) PCT No.: PCT/US2018/018942
§ 371 (c)(1),
(2) Date: Aug. 21, 2019

(87) PCT Pub. No.: WO2018/156573
PCT Pub. Date: Aug. 30, 2018

(65) Prior Publication Data
US 2020/0056735 A1 Feb. 20, 2020

Related U.S. Application Data

(60) Provisional application No. 62/597,965, filed on Dec. 13, 2017, provisional application No. 62/461,957, filed on Feb. 22, 2017.

(51) Int. Cl.
*F16L 55/128* (2006.01)
*E05B 73/00* (2006.01)
*E05B 51/02* (2006.01)
*F16L 55/136* (2006.01)

(52) U.S. Cl.
CPC ............ *F16L 55/128* (2013.01); *E05B 51/02* (2013.01); *E05B 73/00* (2013.01); *F16L 55/136* (2013.01)

(58) Field of Classification Search
CPC ....... F16L 55/136; F16L 55/128; E05B 73/00; E05B 51/02
See application file for complete search history.

(56) References Cited

U.S. PATENT DOCUMENTS

| 3,746,026 A | 7/1973 | Herring |
| 3,902,528 A * | 9/1975 | Tartabini et al. ... G01M 3/2853 138/90 |
| 4,465,104 A * | 8/1984 | Wittman et al. .... F16L 55/1283 138/89 |
| 5,029,614 A | 7/1991 | Lara et al. |
| 7,053,303 B2 | 5/2006 | McCarthy et al. |
| 7,906,726 B1 | 3/2011 | Burkett |

(Continued)

*Primary Examiner* — Kevin L Lee
(74) *Attorney, Agent, or Firm* — Leveque IP Law, P.C.

(57) ABSTRACT

A conduit locking device includes a housing having a first end, a second end, and a sidewall disposed between the first end and the second end. The conduit locking device may further include a slide engaged with the sidewall of the housing, the slide including an extension arm and an end portion structurally configured to engage with an inner wall of a conduit. The slide may be extendable via the extension arm from a first position substantially adjacent to the sidewall of the housing to a second position disposed away from the sidewall of the housing, where, when in the second position, the slide is configured to retain the conduit locking device at a fixed position within the conduit through the engagement of the end portion with the inner wall of the conduit.

44 Claims, 10 Drawing Sheets

(56) References Cited

U.S. PATENT DOCUMENTS

2007/0020974 A1   1/2007  Carlson
2011/0204052 A1*  8/2011  Carson et al. ........ F16L 55/128
                                                           220/237

* cited by examiner

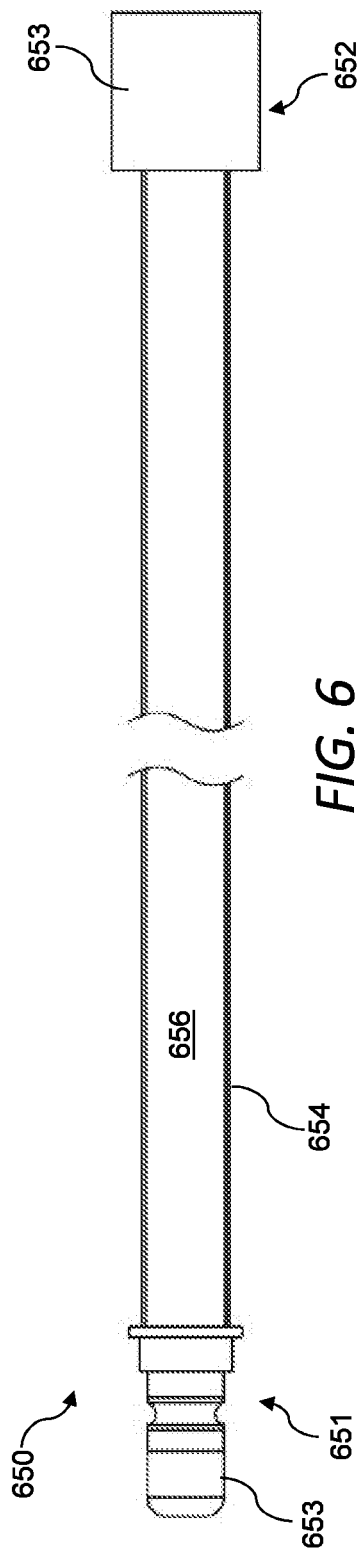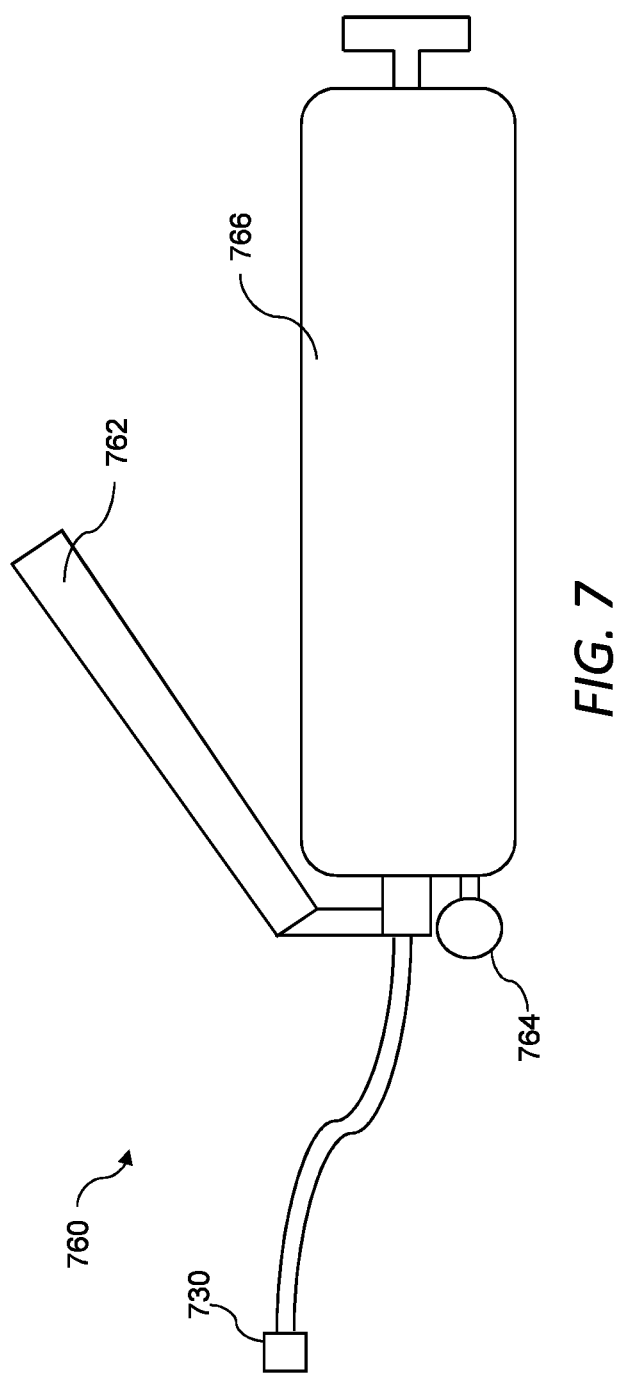

US 10,627,037 B2

DEVICES, SYSTEMS, AND METHODS FOR LOCKING A CONDUIT

CROSS-REFERENCE TO RELATED APPLICATIONS

This application claims priority to U.S. Provisional Application No. 62/461,957 filed on Feb. 22, 2017 and U.S. Provisional Application No. 62/597,965 filed on Dec. 13, 2017, where each of the foregoing applications is hereby incorporated by reference in its entirety.

BACKGROUND

Owners of various pipes, conduits, raceways, and the like, often find that the pathways or channels included therein are being accessed or used by unpermitted or unauthorized users or devices (e.g., wires, cables, piping, and the like). For example, conduits that connect one building to another building or conduits that connect a building to an access point in the sidewalk/street are often leased to a group of users thereby providing these users with an easement or right-of-way for using the conduit. However, in many situations, these same conduits may be used by other unauthorized users (e.g., users lacking such an easement or right-of-way), who pull cable or the like through these conduits without an owner's permission. It is thus common for service personnel or the like to find unauthorized wiring or cable disposed in a conduit. Although locks for raceways and the like may exist in the prior art, they often include deficiencies such as being difficult to use and operate, requiring access into a section of the conduit for insertion/removal, being easily circumvented by an unauthorized user, and the like. Moreover, owners of conduits often have no means of monitoring the status of a conduit, or being alerted to an improper access, a tampering, or a breach of a conduit. There remains a need for devices, systems, and methods for locking pipes, conduits, raceways, and the like from use by an unauthorized user, as well as for improved techniques for monitoring conduits.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

FIG. 6 illustrates a hose of a hydraulic system, in accordance with a representative embodiment.

FIG. 7 illustrates an actuator of a hydraulic system, in accordance with a representative embodiment.

DETAILED DESCRIPTION

Figure 1:
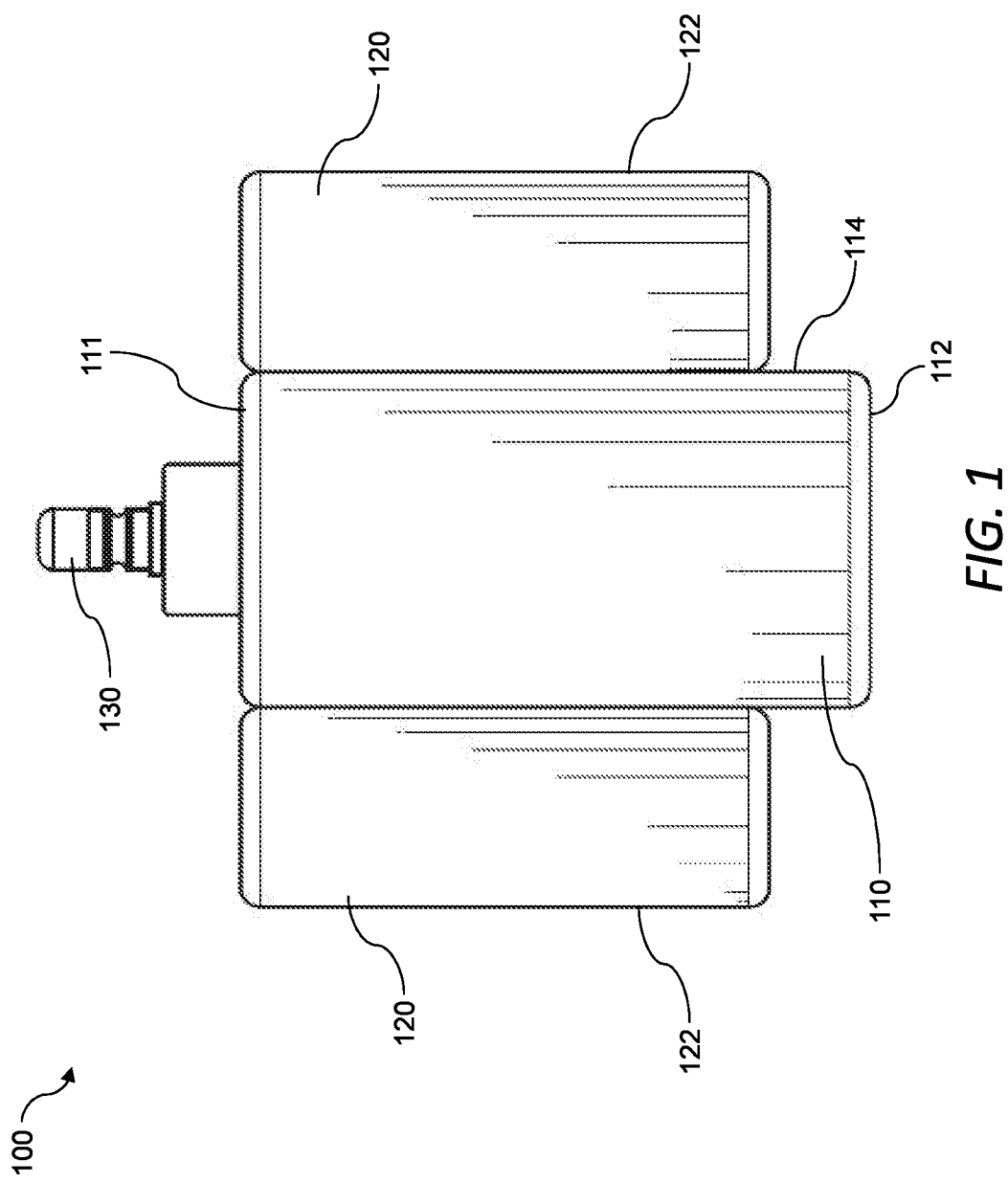
FIG. 1 illustrates a side view of a conduit locking device, in accordance with a representative embodiment.

The various methods, systems, apparatuses, and devices described herein generally provide for locking pipes, conduits, raceways, and the like, as well as techniques and systems for monitoring the same.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

As discussed herein, the disclosure may include methods, systems, apparatuses, and devices for locking pipes, conduits, raceways, and the like. Therefore, for convenience, unless explicitly stated to the contrary or otherwise clear from the context, the term "conduit" as used herein shall include conduits in the traditional sense (e.g., a tube or the like forming a pathway or channel), as well as pipes, raceways, and the like, and/or any other structure forming a pathway, channel, or the like.

Also, unless explicitly stated to the contrary or otherwise clear from the context, the term "lock," "locking," and the like shall refer to both completely locking a conduit or partially locking a conduit. In general, "locking a conduit" and the like, shall refer to preventing use of the conduit by unpermitted or unauthorized users. For example, the devices, systems, and methods described herein may prevent unpermitted or unauthorized users from pulling wires, cables, piping, and the like through the conduit, while allowing for wires, cables, piping, and the like from permitted users. "Locking a conduit" may also or instead include monitoring a conduit, e.g., for breaches, tampering, unauthorized access, and so on.

In an effort to gain access to existing conduits, unauthorized users may pull wires, cables, and the like through existing conduits without an owner's permission. For example, because many existing conduits are not protected/locked, utility contractors, developers, and the like may use existing conduits for their benefit, without permission or approval. Worse yet, once occupied, the conduit may be deemed to be owned by an occupying utility, whether they have an owner's permission or not. The burden of proof may fall on the original installer to subsequently regain ownership of the conduit and the space inside.

Devices, systems, and methods described herein may provide an owner of a conduit (e.g., an underground pipeline system) with the ability to retain the right to use the conduit for their desired purposes, while preventing unauthorized users from accessing or otherwise using the conduit. Additionally, devices, systems, and methods described herein may be used as a means to prompt payment between an owner and a contractor—e.g., payment from the owner to a contractor that has installed pipe but has yet to be compensated for their work, where the contractor can lock the pipe until they receive compensation.

The devices, systems, and methods for locking a conduit may increase the value of ownership of conduits and conduit systems, with or without cables or the like installed therein. For example, a conduit locking device may be customized to fit around existing cables (or the like) to control the use of the existing conduit, e.g., by being placed at locations along the conduit system that are determined to be difficult to compromise or access.

Devices, systems, and methods described herein may also or instead provide for the monitoring of a conduit, e.g., against tampering, damage, infiltration, contamination, occupation, theft, breach, and so on, of the conduit itself and/or its contents. By way of example, if a conduit contains data cables or the like, monitoring of the conduit can alert a user when an attempt is made to tap into the data cables, e.g., for hacking purposes or for accessing sensitive data contained therein. Also, if a conduit contains power cables or the like, monitoring of the conduit can alert a user when an attempt is made to cutoff power, e.g., during an act of theft, terrorism, or the like.

FIG. 1 illustrates a side view of a conduit locking device, in accordance with a representative embodiment. In general, the conduit locking device 100 may be used for insertion into an underground conduit or piping system to lock or block the pathway through the conduit or piping system, or to limit the use of an existing conduit by being installed and locked around existing wires, cables, or the like, while limiting access by other wires, cables, and the like.

The conduit locking device 100 may generally include a housing 110 having a first end 111, a second end 112, and one or more sidewalls 114 disposed between the first end 111 and the second end 112. The conduit locking device 100 may also generally include one or more slides 120 engaged with a sidewall 114 of the housing 110. In general, the conduit locking device 100 may be structurally configured for insertion into a conduit, where one or more of the slides 120 are movable to engage an inner wall of the conduit thereby releasably locking the conduit locking device 100 in place within the conduit. In this manner, the conduit locking device 100 may block access to the conduit, e.g., from cables or the like being inserted into, or pulled through, the conduit. In other words, the conduit locking device 100 may act as an obstruction within the conduit for mitigating unauthorized access thereto. Also, or instead, the conduit locking device 100 may secure contents of the conduit, e.g., by holding existing cabling or the like in place within the conduit, or by preventing access, tampering, and the like to such existing cabling.

The housing 110 may be substantially cylindrical in shape. In this manner, the conduit locking device 100 may include a substantially cylindrically-shaped device with connectors (e.g., hydraulic connectors) on each end of the device for insertion and removal of the conduit locking device 100 within a conduit. The conduit locking device 100 may include one or more extendable slides 120, which may conform to the substantially cylindrical shape of the housing 110, or may be separate from the housing 110 but connected thereto, i.e., having independent shapes. In some implementations, the slides 120 are also or instead substantially cylindrical in shape. The housing 110 and the slides 120 may substantially center the conduit locking device 100 within a conduit while restricting the use of the conduit by utilizing most of the annular space of the conduit, where at least one of the slides 120 is activated for securing the conduit locking device 100 through the use of an actuator such as any of those described herein, e.g., an actuator that uses fluid pressure or the like to extend a slide 120. The conduit locking device 100 may be manufactured to fit conduits of any size.

One or more of the first end 111 and the second end 112 may include a connector 130 as shown in the figure. The connector 130 may be structurally configured to engage with a tool to releasably place the conduit locking device 100 within a conduit. The connector 130 on one or more of the first end 111 and the second end 112 of the housing 110 may include a hydraulic connector or the like. In certain implementations, the first end 111 and the second end 112 of the housing 110 are substantially the same. In other implementations, the first end 111 and the second end 112 of the housing 110 are different.

As stated above, the housing 110 may include one or more sidewalls 114. For example, the housing 110 may be substantially cylindrical, where the sidewall 114 are considered to be the curved surface of the cylindrical shape—thus, the conduit locking device 100 may have a single, continuous sidewall 114. The housing 110 may instead include another shape such as a polyhedron shape, where each side surface is considered to be an individual sidewall 114. In general, the slides 120 form a part of, or are connected to, one or more of the sidewalls 114 for extension toward and away from a sidewall 114.

Thus, the slides 120 may be engaged to one or more of the sidewalls 114 of the housing 110. At least one of the slides 120 may be movable relative to the housing 110—i.e., toward and away from a sidewall 114 of the housing 110. To this end, a slide 120 may include an end portion 122 structurally configured to engage with an inner wall of a conduit.

Figure 2:
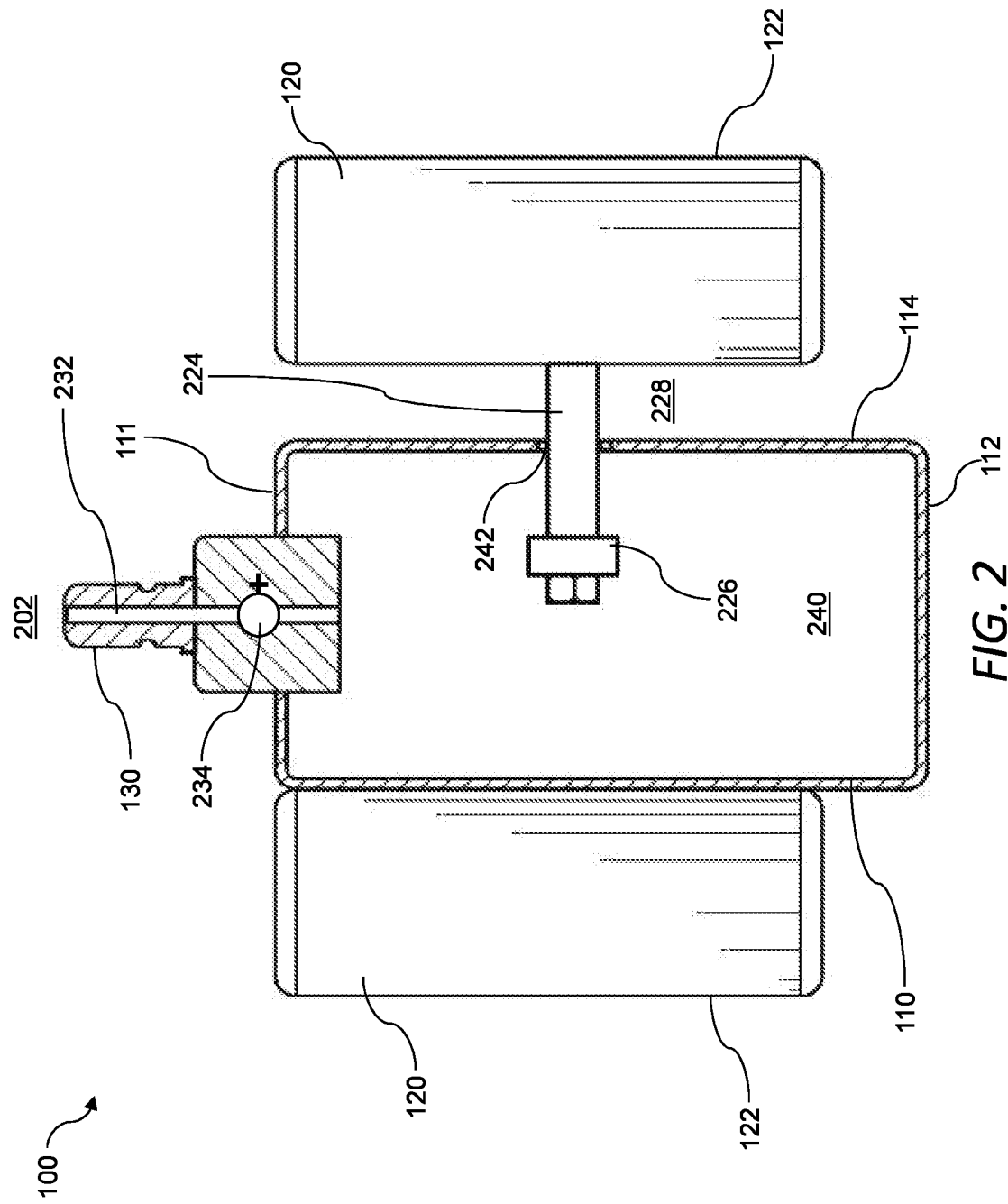
FIG. 2 illustrates a cross-sectional view of a conduit locking device, in accordance with a representative embodiment.

FIG. 2 illustrates a cross-sectional view of a conduit locking device, in accordance with a representative embodiment, which may be the same or similar to the conduit locking device 100 shown and described with reference to FIG. 1. Thus, FIG. 2 shows the conduit locking device 100 having a housing 110 with one or more sidewalls 114 between a first end 111 and a second end 112, and one or more slides 120 each having an end portion 122, where the end portion 122 is structurally configured to engage with an inner wall of a conduit.

As shown in the figure, a slide 120 may also include an extension arm 224 that connects the slide 120 to the housing 110. The slide 120 may be extendable via the extension arm 224 from a first position substantially adjacent to a sidewall 114 of the housing 110 (e.g., the first position can be seen in FIG. 1) to a second position disposed away from a sidewall 114 of the housing 110 (e.g., the second position can be seen in FIG. 2). When in the second position, the slide 120 may be configured to retain the conduit locking device at a fixed position within the conduit through the engagement of the end portion 122 with an inner wall of a conduit.

Thus, the first position being "substantially adjacent to a sidewall 114" shall be understood to mean that the slide 120 is closer to the sidewall 114 of the housing 110 in the first position than in the second position, where the slide 120 is disposed away from the sidewall 114 of the housing 110. In this manner, the slide 120 being "substantially adjacent to a sidewall 114" may include a condition where the slide 120 or a surface thereof (e.g., the end portion 122) forms a part of the sidewall 114 of the housing 110, or a condition where the slide 120 is merely disposed closer to the sidewall 114 of the housing 110 than when the slide 120 is in the second position.

When the conduit locking device 100 is installed within a conduit and at least one of the slides 120 is in the second position, the conduit locking device 100 may be structurally configured to prevent access by a cable from a first location disposed upstream of the conduit locking device 100 within the conduit (e.g., adjacent to the first end 111 of the conduit locking device 100) and a second location disposed downstream of the conduit locking device 100 within the conduit (e.g., adjacent to the second end 112 of the conduit locking device 100). Thus, one or more of the slides 120 and the conduit locking device 100 may generally be sized and shaped to have the conduit locking device 100 utilize a predetermined portion of annular space within a conduit when a slide 120 is in the second position thereby restricting access between a first location disposed upstream of the conduit locking device 100 within the conduit and a second location disposed downstream of the conduit locking device 100 within the conduit.

As discussed herein, the slides 120 may be structurally configured to engage with one or more existing cables disposed within a conduit. To this end, the end portion 122 of the slides 120 may be structurally configured to apply a force to one or more existing cables, e.g., against an inner wall of the conduit. The end portion 122 of one or more of the slides 120 may also or instead be structurally configured to bypass one or more existing cables. To this end, the cables may be directed into a cavity 228 formed between the end portion 122 and a sidewall 114 of the housing 110. Also, or instead, the end portion 122 of one or more of the slides 120 may include a curved outer surface as shown in the figure. Such a curved outer surface can help deflect cables away from the end portion 122 and direct them into the cavity 228 when the slides 120 are moving away from the sidewalls 114, e.g., into the second position.

In certain implementations, at least one of the slides 120 is movable, and at least another one of the slides 120 is fixed. For example, only a single slide 120 may be movable on a conduit locking device 100 from a plurality of slides 120 that are disposed thereon. Also, or instead, a conduit locking device 100 may only include a single slide 120, which may be movable. Alternatively, a conduit locking device 100 may include a plurality of slides 120, where each of the plurality of slides 120 is movable such that all of the slides 120 on a conduit locking device 100 are movable. It will be understood that any number of slides 120 is possible, e.g., one, two, three, four, and so on, and any number of these slides 120 may be movable.

The conduit locking device 100 may include a fluid chamber 240 within the housing 110. For example, in certain implementations, the extension arm 224 may include a piston 226 extending through at least one of the sidewalls 114 of the housing 110 and into the fluid chamber 240. The connector 130 may include a fluid pathway 232 between the fluid chamber 240 and an external environment 202. The fluid pathway 232 may include a valve 234 or the like that permits fluid to be moved from a tool (e.g., actuator or hose) into the fluid chamber 240 during a locking operation to pressurize the fluid chamber 240 thereby extending a slide 120 from the first position to the second position. Also, the valve 234 or the like may permit fluid to be moved out of the fluid chamber 240 during a releasing operation thereby depressurizing the fluid chamber 240 and retracting the slide 120 from the second position to the first position. Thus, the conduit locking device 100 may be a hydraulic device in certain implementations. The valve 234 may include any as known in the art of hydraulic systems.

The conduit locking device 100 may include a seal 242 formed at an interface of the piston 226 and a sidewall 114 of the housing 110. The seal 242 may be structurally configured to prevent fluid from escaping the housing 110 and into a conduit that is being locked and secured.

Figure 4:
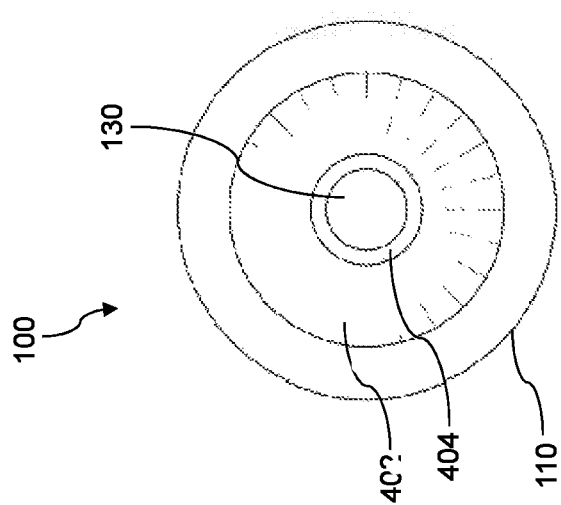
FIG. 4 illustrates a close-up top view of a conduit locking device, in accordance with a representative embodiment.
Figure 3:
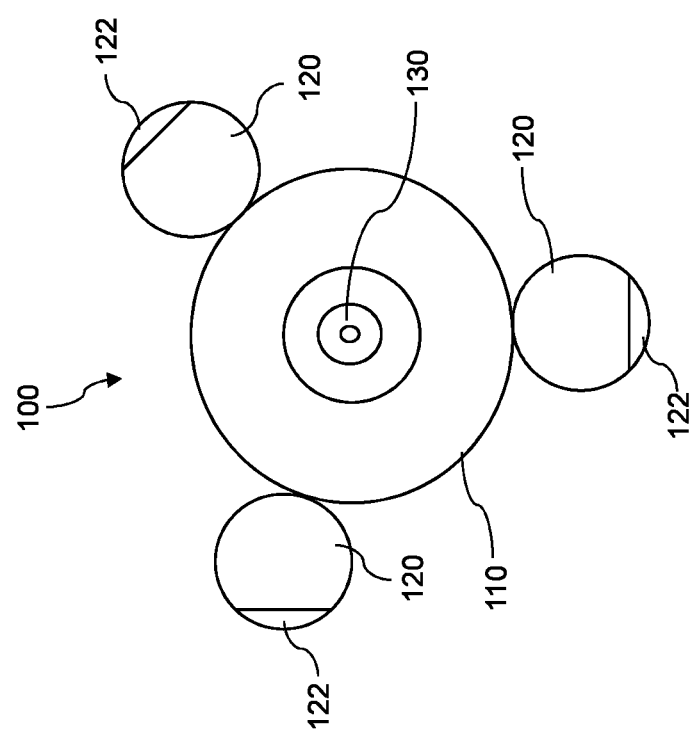
FIG. 3 illustrates a top view of a conduit locking device, in accordance with a representative embodiment.

FIG. 3 illustrates a top view of a conduit locking device, in accordance with a representative embodiment, and FIG. 4 illustrates a close-up top view of a conduit locking device, in accordance with a representative embodiment. The conduit locking devices 100 shown in these figures may be the same or similar to the conduit locking device 100 shown and described with reference to FIG. 1 and FIG. 2. Specifically, FIG. 3 shows a housing 110, slides 120 with corresponding end portions 122, and a connector 130. And FIG. 4 shows the housing 110 and a connector 130, where the connector 130 is surrounded by a beveled surface 402 or otherwise countersunk hole 404. Thus, in certain implementations, one or more of the first end 111 and the second end 112 of the housing 110 may include a countersunk hole 404 to facilitate alignment of a tool (e.g., an end of a hose, an installation tool, a retraction tool, and the like) with the connector 130.

Thus, one or more ends of a conduit locking device 100 may include features to promote alignment of the conduit locking device 100 with one or more other components, e.g., components in a hydraulic system. This alignment may instead be provided by a separate alignment tool in certain implementations. Thus, an alignment tool may be used in the devices, systems, and methods for locking a conduit as described herein. The alignment tool may include high-density polyethylene (HDPE) or polyethylene high-density (PEHD) material of various sizes to fit the internal diameter of most conduits, where the alignment tool has a countersunk hole to facilitate the hydraulic fitting of an end of an insertion tool, an extraction tool, a hydraulic hose, and the like. The diameter may center the conduit locking device 100 within the conduit along with a beveled leading edge assisting with a successful connection.

Figure 5:
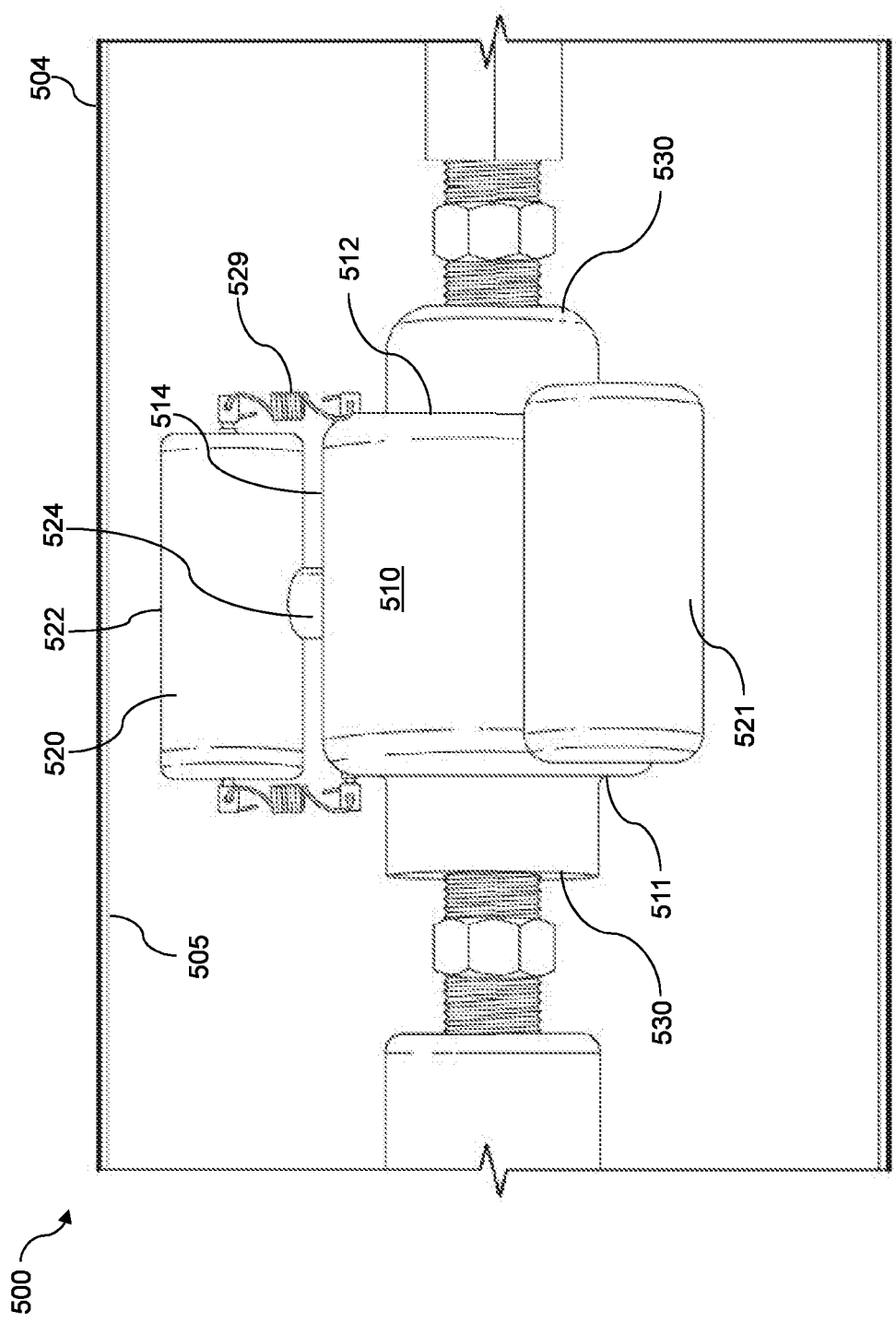
FIG. 5 illustrates a conduit locking device, in accordance with a representative embodiment.

FIG. 5 illustrates a conduit locking device, in accordance with a representative embodiment. Specifically, FIG. 5 shows a conduit locking device 500, which may be the same or similar to those described above. Specifically, the conduit locking device 500 may include a housing 510 having a first end 511, a second end 512, and a sidewall 514 disposed between the first end 511 and the second end 512. The conduit locking device 500 may further include a first connector 530 on one or more of the first end 511 and the second end 512 of the housing 510, e.g., on both ends of the housing 510 as shown in the figure. The conduit locking device 500 may also include a slide 520 engaged with a sidewall 514 of the housing 510, where the slide 520 includes an end portion 522 structurally configured to engage with an inner wall 505 of a conduit 504. The slide 520 may further include an extension arm 524 such that the slide 520 is extendable via the extension arm 524 from a first position substantially adjacent to the sidewall 514 of the housing 510 to a second position disposed away from the sidewall 514 of the housing 510, where, when in the second position, the slide 520 is configured to retain the conduit locking device 500 at a fixed position within the conduit 504 through the engagement of the end portion 522 with the inner wall 505 of the conduit 504.

The conduit locking device 500 may also include one or more spring elements 529 that apply a spring force to the slide 520, or otherwise between the slide 520 and the housing 510. For example, the spring force applied by a spring element 529 may urge the slide 520 toward the sidewall 514 during a releasing operation (or otherwise when not in a locking operation, or in a locked or locking state). A spring element 529 may also or instead otherwise urge the slide 520, e.g., toward the inner wall 505 of the conduit 504 during a locking operation, or in a locked or locking state.

As discussed herein, one or more of the slides 520 may be movable, and one or more of the slides 520 may be fixed— e.g., the second slide 521 shown in the figure may be fixed, while the other slide 520 pictured is movable. Such a fixed second slide 521 may resemble the general size and shape of the movable slide 520, or it may have a different size and shape. In some implementations, only one slide 520 is provided and it is movable.

The conduit locking device 500 may be part of a system as described throughout this disclosure. For example, each of the connectors on the first end 511 and the second end 512 may include a connection to a hydraulic component, such as a hose or the like. In this manner, the conduit locking device 500 may be one in a series of a plurality of devices in the system, where each is in fluid communication with one another, e.g., a primed hydraulic system where movement of a slide 520 in one conduit locking device 500 may also move a slide in another device. Also, or instead, slides 520 in different devices may be independently movable in a system. Further, conduit locking devices 500 throughout a system may remain in fluid communication with one another during use. In other implementations, one or more conduit locking devices 500 may be placed into a conduit 504 for locking the conduit 504, and then other hydraulic components and tools may be removed, while the conduit locking device 500 remains. In this manner, the conduit locking device 500 may be reconnected to hydraulic components and tools for removal of the conduit locking device 500 from the conduit 504.

FIG. 6 illustrates a hose of a hydraulic system, in accordance with a representative embodiment. The hose 650 may have a first hose end 651 and a second hose end 652, where each of the ends of the hose 650 may include a connector 653. For example, the first hose end 651 may include a second connector as described herein, which is structurally configured for engagement with a first connector of a conduit locking device as described herein. Thus, the connector 653 on one or more of the ends of the hose 650 may include a hydraulic connector structurally configured for engagement with a corresponding hydraulic connector on another component, such as a conduit locking device or an actuator as described herein. Each of the ends of the hose 650 may include the same connector 653 (e.g., the second connector) or a different connector 653 as shown in the figure—e.g., different shapes or sizes of hydraulic connectors for connecting to different components.

The hose 650 may be structurally configured to insert a conduit locking device within a conduit. Thus, the hose 650 may have a sufficient rigidity to push a conduit locking device to a desired position in a conduit, or the hose 650 may be used to pull a conduit locking device through a conduit. The hose 650 may also or instead be structurally configured to extract a conduit locking device from a conduit. Thus, the connectors 653 disposed at both ends of the hose 650 may be structurally configured for inserting a conduit locking device at a desired location within a conduit, and for extracting a conduit locking device from that location in a conduit. The hose 650 may remain in the conduit when the conduit locking device is in use, or the hose 650 may be extracted after a conduit locking device is set into a desired location and locked within a conduit.

The hose 650 may include an outer casing 654 and an inner tubing 656. The outer casing 654 may include a polyvinyl chloride (PVC) material or the like. The inner tubing 656 may include high-pressure tubing, e.g., a high-pressure rubber hose or the like. The hose 650 may be a variety of lengths in implementations—e.g., relatively short, such as between about 8 feet to about 10 feet long, or relatively long such as about 100 feet or more. Other sizes are possible.

The hose 650 may act as, or be connected to, an insertion device for a hydraulic system. For example, and as described herein, a conduit locking device may be inserted into a conduit through the end of the conduit, e.g., into an opening in the end of the conduit such as that in the basement of a building. And, in some implementations, the conduit locking device may be inserted into the conduit using an insertion device. For example, in an implementation, the insertion device may include a pump having a pipe such as a PVC pipe that can provide a desired rigidness. A hose 650, such as a hydraulic hose or the like, may carry a hydraulic fluid or the like from the pump to the conduit locking device. As described herein, the position of the conduit locking device within the conduit may vary, and the quantity of conduit locking devices within a conduit may vary to satisfy an owner or user's purposes. The conduit locking device may also or instead be inserted into the conduit by pulling the conduit locking device through the conduit, e.g., using a fish tape or the like.

FIG. 7 illustrates an actuator of a hydraulic system, in accordance with a representative embodiment. The actuator 760 may be used to engage a second hose end, where a first hose end is connected to a conduit locking device as described herein. Generally, the actuator 760 may be activatable to perform one or more of (i) dispersing fluid through a hose and into a fluid chamber of a conduit locking device, and (ii) receiving fluid into the hose from the fluid chamber of the conduit locking device.

The actuator 760 may include a manual fluid pump as shown in the figure, where activating the manual fluid pump comprises movement of a lever 762 or the like. Thus, the actuator 760 may include a barrel 766 (e.g., a grease tube or the like), an actuation device (e.g., a manual handle or lever 762 for pressing by a user), a gauge 764, and a connector 730. Other types of pumps may also or instead be used, e.g., electric pumps and the like. A hydraulic piston, e.g., actuatable using a tool, may also or instead be used. In general, the actuator 760 may include a pressure chamber that can deliver one or more types of fluids to a conduit locking device as described herein. To this end, the actuator 760 may include a gauge 764, e.g., a pressure gauge for measuring and displaying pressure information for a hydraulic system.

Thus, an actuator 760 for engaging a conduit locking device to walls of a conduit may use fluid pressure. The fluid pressure may be provided by an actuator 760 that is the same or similar to a manual grease pump or the like as shown in the figure. The actuator 760 may also or instead take other forms, such as an electrically or mechanically operated pump. For example, the actuator 760 may also or instead include a hydraulic piston that is activated electrically or manually. The fluid may enter a fluid chamber within a conduit locking device to extend one or more of the slides toward the inner walls of a conduit.

Figure 8:
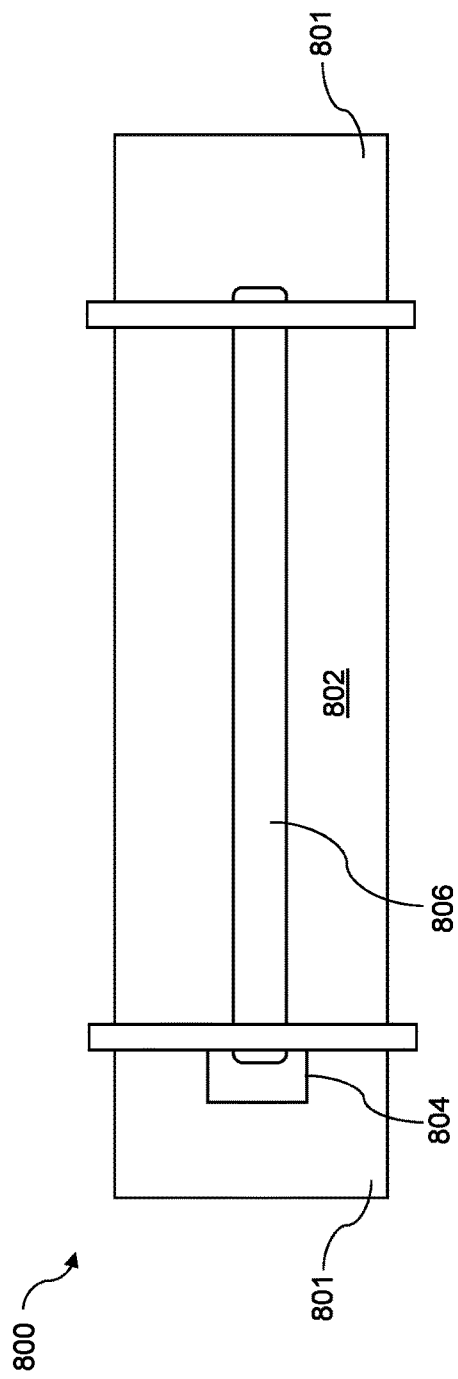
FIG. 8 illustrates an extraction tool, in accordance with a representative embodiment.

FIG. 8 illustrates an extraction tool, in accordance with a representative embodiment. The extraction tool 800 may be used to relieve pressure on a conduit locking device, where the extraction tool 800 may be used to extract the conduit locking device after pressure is released.

The extraction tool 800 may include one or more connectors 801 for connecting to a first connector of a conduit locking device and a second connector of a hose in a hydraulic system—e.g., disposed between the hose and the conduit locking device. The extraction tool 800 may instead be connected directly to the conduit locking device. In general, the extraction tool 800 may be structurally configured to extract a conduit locking device from a conduit. In some implementations, the extraction tool 800 may be omitted or the extraction tool 800 may be integral with another component of a hydraulic system such as an actuator or a hydraulic hose.

The extraction tool 800 may include a second fluid chamber 802 in fluid communication with a valve 804 to transfer fluid from a fluid chamber of a conduit locking device to the second fluid chamber 802 of the extraction tool 800 thereby depressurizing the fluid chamber of the conduit locking device. Thus, an extraction tool 800 may be used in the devices, systems, and methods for locking a conduit as described herein. In some implementations, the extraction tool 800 may include a steel cylinder or the like with hydraulic fittings and a movable piston 806 disposed in a body of the extraction tool 800. The extraction tool 800 may be designed to relieve pressure from a conduit locking device and to deposit hydraulic fluid into its fluid chamber.

Figure 9:
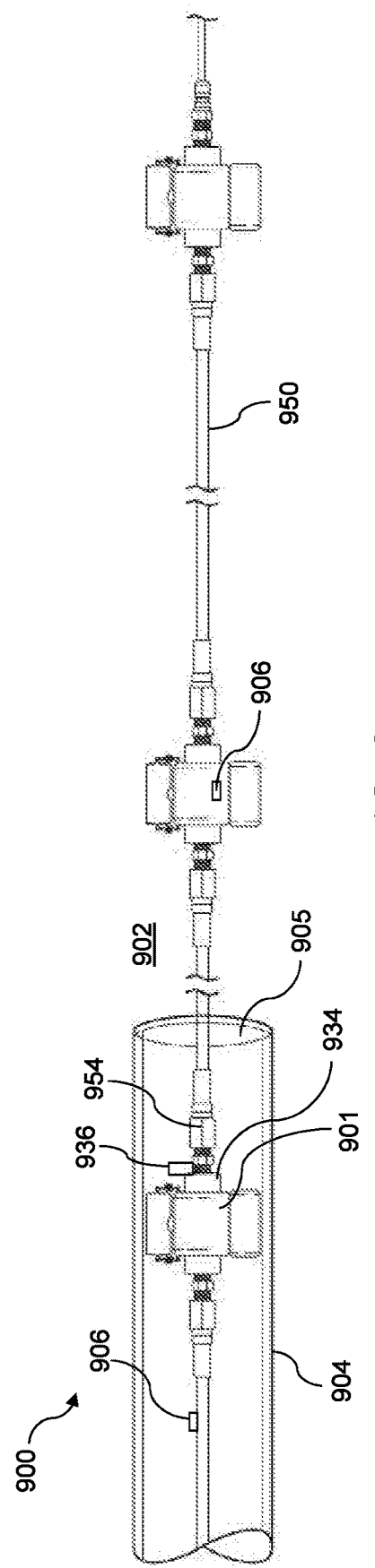
FIG. 9 illustrates the installation of a system for locking a conduit, in accordance with a representative embodiment.

FIG. 9 illustrates the installation of a system for locking a conduit, in accordance with a representative embodiment. In general, the system 900 may include one or more conduit locking devices 901 such as any as described herein, where the conduit locking devices 901 are shown in the figure as being installed into a conduit 904 from an external environment 902. The system 900 may also include one or more hoses 950 or other insertion tubes/devices/tools and one or more sensors 906.

In implementations, the installation of conduit locking devices 901 may include inserting a conduit locking device 901 in a conduit 904, connecting fittings and control wires, inserting another conduit locking device 901 in the conduit 904, connecting wires to sensors 906 or the like, creating a predetermined pressure in the system 900 (e.g., to "prime" the system 900), and attaching control wires from sensors 906 (e.g., shock and pressure sensors) to a control panel or controller.

The external environment 902 from which the conduit locking devices 901 are installed may include a portion of a building such as a basement or the like, where the conduit 904 includes an access point 905 or end. The external environment 902 may also or instead include another area for accessing a conduit 904, such as a manhole or the like.

The sensors 906 may include, without limitation, one or more of a pressure sensor, a shock sensor, a location sensor, a capacitive sensor, an inductive sensor, an ultrasonic sensor, an optical sensor, an infrared sensor, a temperature sensor, a moisture detection sensor, an acoustic or sound sensor, a vibration sensor, a chemical sensor (e.g., oxygen, carbon-dioxide, and so on), a motion and proximity sensor, a magnetic sensor, a flow sensor, a radiation sensor, an imaging sensor, a force sensor, an electrical current sensor, an environmental sensor, a humidity sensor, a displacement sensor, and the like. In general, the sensors 906 may include a device to detect a presence or absence of an object at a predetermined location—e.g., whether a certain cable is present or absent, or detecting infiltration of the conduit 904 by a rogue object or person. The sensors 906 may also or instead include more complex sensing and processing systems or subsystems, such as a three-dimensional scanner using optical techniques (e.g., stereoscopic imaging, shape from motion imaging, and the like), structured light techniques, or any other suitable sensing and processing hardware that might extract information from a conduit 904 or its surroundings, e.g., the external environment 902 or an internal environment within the conduit 904.

The system 900 may further include a releasing element 936 structurally configured to disconnect a first connector 934 of the conduit locking device 901 and the second connector 954 of a hose 950. The releasing element 936 may be disposed on one or more of the first connector 936 and the second connector 954. In some implementations, the releasing element 936 includes a device similar to the extraction tool 800 described with reference to FIG. 8. The releasing element 936 may also or instead include a simpler device such as a release pin, button, knob, screw threads, quick disconnect device, and so on. Thus, in some implementations, the releasing element 936 or the like may provide for removal of one or more of the hoses 950 or other components of the system 900 from the conduit 904, e.g., after the installation of one or more of the conduit locking devices 901. In other implementations, one or more of the hoses 950 may remain in the conduit 904, e.g., after the installation of one or more of the conduit locking devices 901.

In certain implementations, upon gaining access to the conduit 904 to be secured, e.g., by entering a manhole or a hand hole, the internal diameter of the conduit 904 may be determined along with the material of the conduit, e.g., HDPE, steel, PVC, and so on. The length of the conduit 904 may be determined, where any or all of this information can assist with the selection of the type, size, and desired number of conduit locking devices 901 to achieve a desired goal. For example, if a conduit 904 is readily accessible through its entire length, a plurality of conduit locking devices 901 may provide improved security.

The conduit locking devices 901 for the desired application may then be selected, e.g., based on size (such as the diameter of the conduit 904), material, or otherwise. An insertion tool or the like may be connected to one or more of the conduit locking devices 901, or the conduit locking devices 901 may be attached to one or more hoses 950, and the conduit locking devices 901 may begin to be installed in the conduit 904. After installing a desired number of conduit locking devices 901 in desired locations, an actuation device may be attached or activated. For example, a manual pump may be connected, where the manual pump is used to pressurize the system 900 to a predetermined pressure rating (e.g., based on the conduit locking devices 901 or the length of the conduit 904). The actuation device may then be released and removed from the last installed conduit locking devices 901, hose 950, or insertion tool.

Stated otherwise, the desired number of conduit locking devices 901 may be installed in a conduit 904, where the conduit locking devices 901 may communicate with one another or operate independently of one another. Installing the desired number of conduit locking devices 901 may include installing any controls or control wiring, e.g., to communicate with the sensors 906 or other components of the system 900. After the desired number of conduit locking devices 901 are installed, an actuator such as a pump (e.g., a manual pump) may be attached, where the pump is configured to pressurize the system to a predetermined pressure rating. The pump may be released and removed after installation of the system 900 in an embodiment. An actuator may also or instead include a hydraulic cylinder or the like that is activated to pressurize the system 900 and lock the conduit locking devices 901 in place. Control wires such as sensor control wires (e.g., for a shock sensor or the like) and pressure switch control wires may be connected from the conduit locking devices 901 to a control panel, a controller, or the like (and/or between multiple conduit locking devices 901).

The procedure for removal of the conduit locking devices 901 may be the opposite of the installation procedure, but may also include the use of an extraction tool and alignment tool. In an implementation, an alignment tool may be attached to an extraction device and then to an insertion tool. The alignment tool may center itself within a conduit 904 and then press forward on the insertion tool to complete the connection to a conduit locking device 901. The actuator (e.g., manual pump) may be attached to the insertion tool, where it is activated, e.g., a lever is pressed until a piston inside the extraction tool activates to release the pressure on a conduit locking device 901, where the fluid or the like may be deposited into a fluid chamber of the extraction tool and be connected by the hydraulic fitting for removal. A tool or the like (e.g., an actuation tool) may also or instead be used to operate a hydraulic cylinder or the like to depressurize the system 900 and unlock the conduit locking devices 901.

Figure 10:
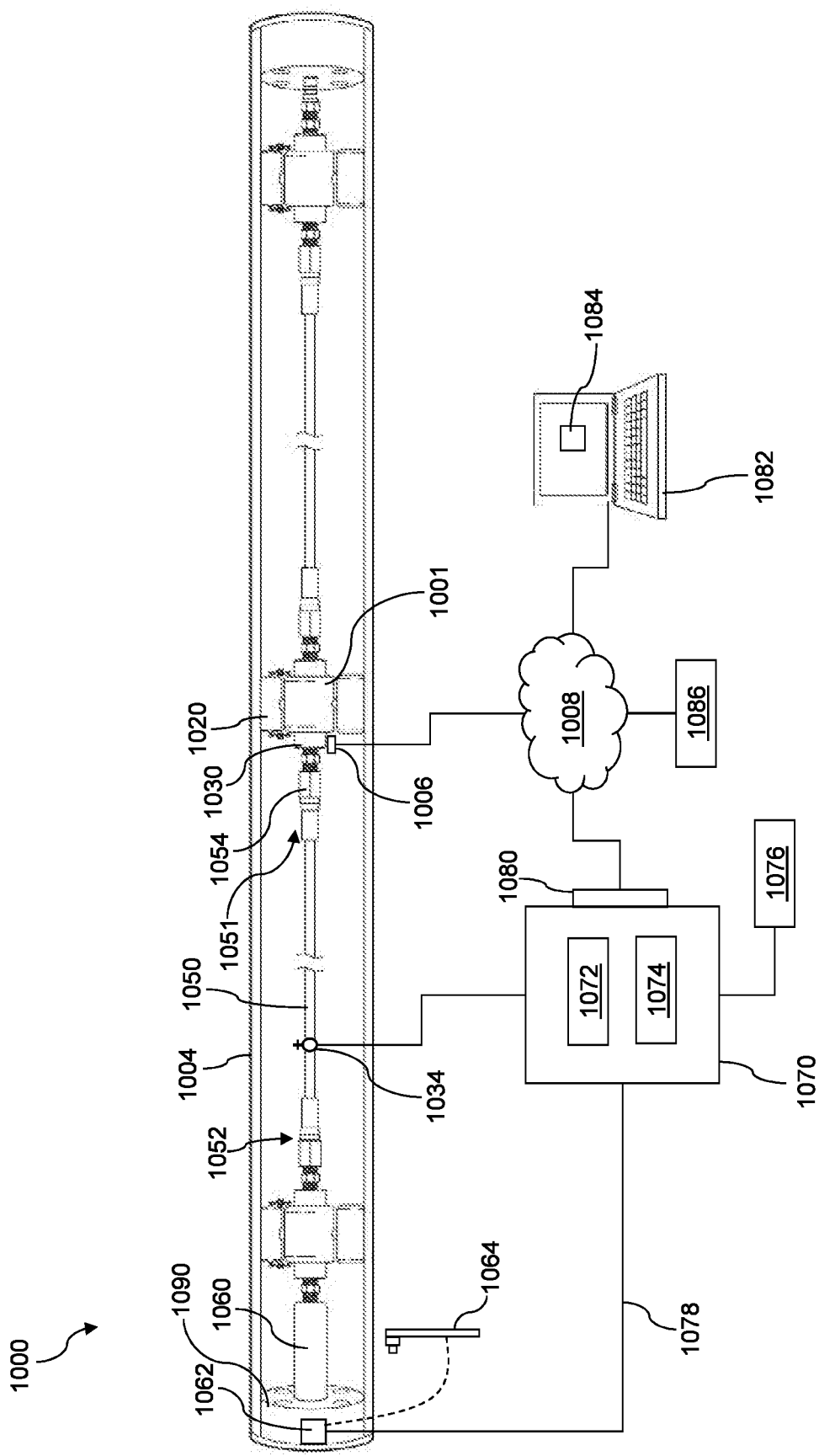
FIG. 10 illustrates a system for locking a conduit, in accordance with a representative embodiment.

FIG. 10 illustrates a system for locking a conduit, in accordance with a representative embodiment. As shown in the figure, the system 1000 may include one or more conduit locking devices 1001, one or more hoses 1050, an actuator 1060, a controller 1070 having a processor 1072 and a memory 1074, a control panel 1076, control wiring 1078, a communications interface 1080, sensors 1006 (e.g., integrated shock sensors), an end cap 1090, and so on, where one or more of the components of the system 1000 are in communication or are otherwise connected over a network 1008. The system 1000 may be used to secure and monitor a conduit 1004 with or without existing cables included therein.

As described herein, the conduit locking devices 1001 may include a housing having a first end, a second end, and one or more sidewalls disposed between the first end and the second end. The conduit locking devices 1001 may further include a first connector 1030 on one or more of the first end and the second end of the housing. The conduit locking devices 1001 may also include one or more slides 1020 engaged with a sidewall of the housing. At least one of the slides 1020 may include an end portion structurally configured to engage with an inner wall of a conduit 1004 and an extension arm, where the slide 1020 is extendable via the extension arm from a first position substantially adjacent to a sidewall of the housing to a second position disposed away from the sidewall of the housing. When in the second position, the slide 1020 may be configured to retain the conduit locking device 1001 at a fixed position within the conduit 1004 through the engagement of the end portion with the inner wall of the conduit 1004.

The conduit locking devices 1001 may also include a fluid chamber within the housing. The extension arm may thus include a piston extending through a sidewall of the housing and into the fluid chamber. The first connector 1030 may include a fluid pathway between the fluid chamber and an external environment (e.g., one of the hoses 1050). The fluid pathway may include a valve 1034 permitting fluid to be moved into the fluid chamber during a locking operation to pressurize the fluid chamber thereby extending the slide 1020 from the first position to the second position. The valve 1034 may also or instead permit fluid to be moved out of the fluid chamber during a releasing operation thereby depressurizing the fluid chamber and retracting the slide 1020 from the second position to the first position.

It will be understood that the valve 1034 may be an independent component in the system 1000 as shown in the figure, or the valve may be included on, or integral with, another component of the system 1000. For example, in an implementation, the valve is part of the actuator 1060. To this end, the actuator 1060 may be the component in the system 1000 that permits fluid to be moved into the fluid chamber during a locking operation to pressurize the fluid chamber thereby extending the slide 1020 from the first position to the second position, as well as the component that permits fluid to be moved out of the fluid chamber during a releasing operation thereby depressurizing the fluid chamber and retracting the slide 1020 from the second position to the first position.

The system 1000 may also include a hydraulic system or subsystem coupled to the conduit locking device 1001, where the hydraulic system may include one or more hoses 1050 and one or more actuators 1060.

As described herein, the hose 1050 may have a first hose end 1051 and a second hose end 1052. The first hose end 1051 may include a second connector 1054 structurally configured for engagement with the first connector 1030 of a conduit locking device 1001.

In the system 1000, and as described herein, the first connector 1030 may be disposed within a countersunk hole or the like on one or more of the first end and the second end of the housing of a conduit locking device 1001. In this manner, if the second connector 1054 includes a beveled end or the like, the second connector 1054 can be more easily engaged with the first connector 1030, e.g., by being guided by the countersunk hole or the like.

The actuator 1060 may be engaged to the second hose end 1052, where the actuator 1060 is selectively activatable to perform one or more of: (i) dispersing fluid through the hose 1050 and into the fluid chamber of the conduit locking device 1001 when the hose 1050 is connected to the conduit locking device 1001, and (ii) receiving fluid into the hose 1050 from the fluid chamber of the conduit locking device 1001 when the hose 1050 is connected to the conduit locking device 1001.

The actuator 1060 may be any as described herein. For example, the actuator 1060 may include one or more of a hydraulic cylinder and a pump. Thus, the actuator 1060 may include a hydraulic piston contained within a hydraulic cylinder. The actuator 1060 may also or instead include an activator 1062 operable to activate the actuator 1060 or a component thereof. For example, the activator 1062 may be in cooperation with a hydraulic piston, where the activator 1062 is operable to move the hydraulic piston. The system 1000 may further include a tool 1064 structurally configured to engage and actuate the activator 1062. The tool 1064 may include a key to cooperate with the activator 1062. For example, the tool 1064 may include a ratcheting device or the like having a specially-keyed end for engagement with the activator 1062. In some implementations, turning the activator 1062 (e.g., using the tool 1064) may result in translation or other movement of a component of the actuator 1060 such as a hydraulic piston contained within a hydraulic cylinder. In some implementations, the actuator 1060 may be coupled to, or integral with, the end cap 1090.

The system 1000 may thus further include an end cap 1090 structurally configured to engage with an end of the conduit 1004. The end cap 1090 may be actuatable to seal the end of the conduit 1004. The end cap 1090 may also or instead be lockable on the end of the conduit 1004, e.g., in the sealed state. As stated above, the actuator 1060 may be at least partially contained on or within the end cap 1090.

As described herein, the system 1000 may include one or more sensors 1006. A sensor 1006 may be disposed on at least one of the conduit locking device 1001, a component of the hydraulic system (e.g., a valve 1034, a hose 1050, a connector, and so on), the conduit 1004, the end cap 1090, and so on. The sensors 1006 may be in communication with the controller 1070. The sensors 1006 may include any as described herein, e.g., at least one of a pressure sensor and a shock sensor.

The controller 1070 may include, or otherwise be in communication with, a processor 1072, a memory 1074, a control panel 1076, and control wiring 1078 for controlling one or more of the components of the system 1000. Thus, in general, the controller 1070 may be electronically coupled (e.g., wired or wirelessly) in a communicating relationship with one or more of the conduit locking devices 1001, the sensors 1006, the hose 1050 or connectors, the actuator 1060, the end cap 1090, and other components of the system 1000. The controller 1070 may be operable to control one or more of the components of the system 1000.

The controller 1070 may be configured to lock and unlock the conduit locking devices 1001 or to otherwise control the hydraulic components of the system 1000, e.g., based on signals received from one or more of the sensors 1006, or instructions received from a user or otherwise. In general, the controller 1070 may be electrically coupled in a communicating relationship, e.g., an electronic communication, with any of the components of the system 1000. In general, the controller 1070 may be operable to control the components of the system 1000, and may include any combination of software and/or processing circuitry suitable for controlling the various components of the system 1000 described herein including without limitation processors 1072, microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and the like. In certain implementations, the controller 1070 may include the processor 1072 or other processing circuitry with sufficient computational power to provide related functions such as executing an operating system, providing a graphical user interface (e.g., to a display coupled to the control panel 1076 or another component of the system 1000), set and provide rules and instructions for operation of the conduit locking device 1001 or another component of the system 1000, convert sensed information into instructions, notifications, and the like, and operate a web server or otherwise host remote operators and/or activity through one or more communications interfaces 1080 described below. In certain implementations, the controller 1070 may include a printed circuit board, an Arduino controller or similar, a Raspberry Pi controller or the like, a prototyping board, or other computer related components.

The controller 1070 may be a local controller disposed on a conduit locking device 1001 or another component of the system 1000, or a remote controller 1070 otherwise in communication with the system 1000 and its components. For example, one or more of the controller 1070 and a user interface in communication with the controller 1070 may be disposed on an external component (e.g., a computing device 1082) in communication with the system 1000 over a data network 1008.

The processor 1072 of the controller 1070 may include an onboard processor for the conduit locking device 1001 or another component of the system 1000. The processor 1072 may also or instead be disposed on a separate computing device 1082 that is connected to the system 1000 or one or more of its components through a data network 1008, e.g., using the communications interface 1080, which may include a Wi-Fi transmitter and receiver. The processor 1072 may perform calculations, e.g., for moving the conduit locking devices 1001 between locked and unlocked configurations.

The processor 1072 may be any as described herein or otherwise known in the art. The processor 1072 may be included on the controller 1070, or it may be separate from the controller 1070, e.g., it may be included on a computing device 1082 in communication with the controller 1070 or another component of the system 1000. In an implementation, the processor 1072 is included on, or is in communication with, a server that hosts an application for operating and controlling the system 1000.

The memory 1074 may be any as described herein or otherwise known in the art. The memory 1074 may contain computer code and may store data such as sequences of positioning for the conduit locking devices 1001, sequences for notifications and alerts, and so on. The memory 1074 may contain computer executable code stored thereon that provides instructions for the processor 1072 for implementation. The memory 1074 may include a non-transitory computer readable medium.

The system 1000 may further include a computing device 1082 in communication with one or more of the components of the system 1000 including without limitation the controller 1070. The computing device 1082 may include a user interface 1084 (or the user interface 1084 may be included on the control panel 1076 or elsewhere in the system 1000), e.g., in communication with the controller 1070. The user interface 1084 may be used, e.g., to lock and unlock the conduit locking devices 1001, monitor the system 1000, or otherwise.

The computing device 1082 may include any devices within the system 1000 operated by operators or otherwise to manage, monitor, communicate with, or otherwise interact with other participants in the system 1000. This may include desktop computers, laptop computers, network computers, tablets, smartphones, smart watches, PDAs, or any other device that can participate in the system 1000 as contemplated herein. In an implementation, the computing device 1082 (and a user interface 1084 thereof) is integral with another participant in the system 1000.

The computing device 1082 may generally provide a user interface 1084, which may include a graphical user interface, a text or command line interface, a voice-controlled interface, and/or a gesture-based interface. In general, the user interface 1084 may create a suitable display on the computing device 1082 for operator interaction. In implementations, the user interface 1084 may control operation of one or more of the components of the system 1000, as well as provide access to and communication with the controller 1070, processor 1072, and other resources.

The user interface 1084 may be maintained by a locally executing application on the computing device 1082 that receives data from one or more of the components of the system 1000 or other resources. In other embodiments, the user interface 1084 may be remotely served and presented on a computing device 1082, such as where the controller 1070 includes a web server that provides information through one or more web pages or the like that can be displayed within a web browser or similar client executing on the computing device 1082. In implementations, the user interface 1084 may also or instead be provided by and/or disposed on another participant in the system 1000.

The data network 1008 may be any network(s) or internetwork(s) suitable for communicating data and control information among participants in the system 1000. This may include public networks such as the Internet, private networks, telecommunications networks such as the Public Switched Telephone Network or cellular networks using third generation (e.g., 3G or IMT-2000), fourth generation (e.g., LTE (E-UTRA) or WiMAX-Advanced (IEEE 802.16m) and/or other technologies, as well as any of a variety of corporate area or local area networks and other switches, routers, hubs, gateways, and the like that might be used to carry data among participants in the system 1000. The data network 1008 may include wired or wireless networks, or any combination thereof. One skilled in the art will also recognize that the participants shown the system 1000 need not be connected by a data network 1008, and thus can be configured to work in conjunction with other participants independent of the data network 1008.

Communication over the data network 1008, or other communication between components of the devices or systems described herein, may be provided via one or more communications interfaces 1080. The communications interface 1080 may include, e.g., a Wi-Fi receiver and transmitter to allow the logic calculations to be performed on a separate computing device 1082. This may include connections to smartphone applications and the like. More generally, the communications interface 1080 may be suited such that any of the components of the system 1000 can communicate with one another. Thus, the communications interface 1080 may be present on one or more of the components of the system 1000. The communications interface 1080 may include, or be connected in a communicating relationship with, a network interface or the like. The communications interface 1080 may include any combination of hardware and software suitable for coupling the components of the system 1000 to a remote device (e.g., a computing device 1082 such as a remote computer or the like) in a communicating relationship through a data network 1008. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple into a local area network or the like that is in turn coupled to a data network such as the internet. This may also or instead include hardware/software for a WiMAX connection or a cellular network connection (using, e.g., CDMA, GSM, LTE, or any other suitable protocol or combination of protocols). Additionally, the controller 1070 may be configured to control participation by the components of the system 1000 in any network to which the communications interface 1080 is connected, such as by autonomously connecting to the data network 1008 to retrieve status updates and the like.

The system 1000 may include other hardware 1086. In certain implementations, the other hardware 1086 may include a camera or the like. The camera may allow a user to view the conduit 1004 in real-time, or to view recorded information, where such information may be stored on the memory 1074. This can enable a user to gauge the performance of the system 1000.

The other hardware 1086 may also or instead include a power source. The power source may be any known in the art or that will become known in the art. For example, power sources may include an AC to DC converter (e.g., grid power), solar power, battery power, wind power, fossil fuel sourced power, and so on.

The other hardware 1086 may also or instead include input devices such as a keyboard, a touchpad, a computer mouse, a switch, a dial, a button, and the like, as well as output devices such as a display, a speaker or other audio transducer, light emitting diodes or other lighting or display components, and the like. Other hardware 1086 of system 1000 may also or instead include a variety of cable connections and/or hardware adapters for connecting to, e.g., external computers, external hardware, external instrumentation or data acquisition systems, and the like.

In general, the system 1000 may include communication of one or more components therein over a network 1008, wired or wireless. This may include a self-healing network, such as a mesh network based on low-power Bluetooth or the like. The system 1000 may include automatic alerts sent to users, e.g., when one or more of the sensors 1006 are triggered. The system 1000 may integrate with a graphical user interface on a computing device 1082 such as a computer, control station, or mobile phone. The system 1000 may perform analytics—e.g., long-term analytics. The system 1000 may recognize patterns, e.g., using baseline pattern recognition. The system 1000 may be able to locate suspected penetrations or faults in the conduit 1004, e.g., via sensor proximity rules. The system 1000 may be able to detect other anomalies. The system 1000 may be capable of modeling and training sensor sensitivity for local activity to reduce false positives. The system 1000 may be aware of patches (e.g., of three or more neighbor patches), and those in adjacent conduits. The system 1000 may include one or more alarms, which can be triggered by the one or more sensors 1006. The system 1000 may be capable of being placed in one or more modes, such as an armed mode, a maintenance mode, a secure conduit mode, an unsecure conduit mode, and the like.

The system 1000 may be charged or primed such that actuating a hydraulic piston or the like will activate one or more of the conduit locking devices 1000 in the conduit 1004. The system 1000 may include one or more conduit locking devices 1001, where the conduit locking devices 1001 may include a connected device to be utilized individually or in tandem throughout the conduit 1004.

Figure 11:
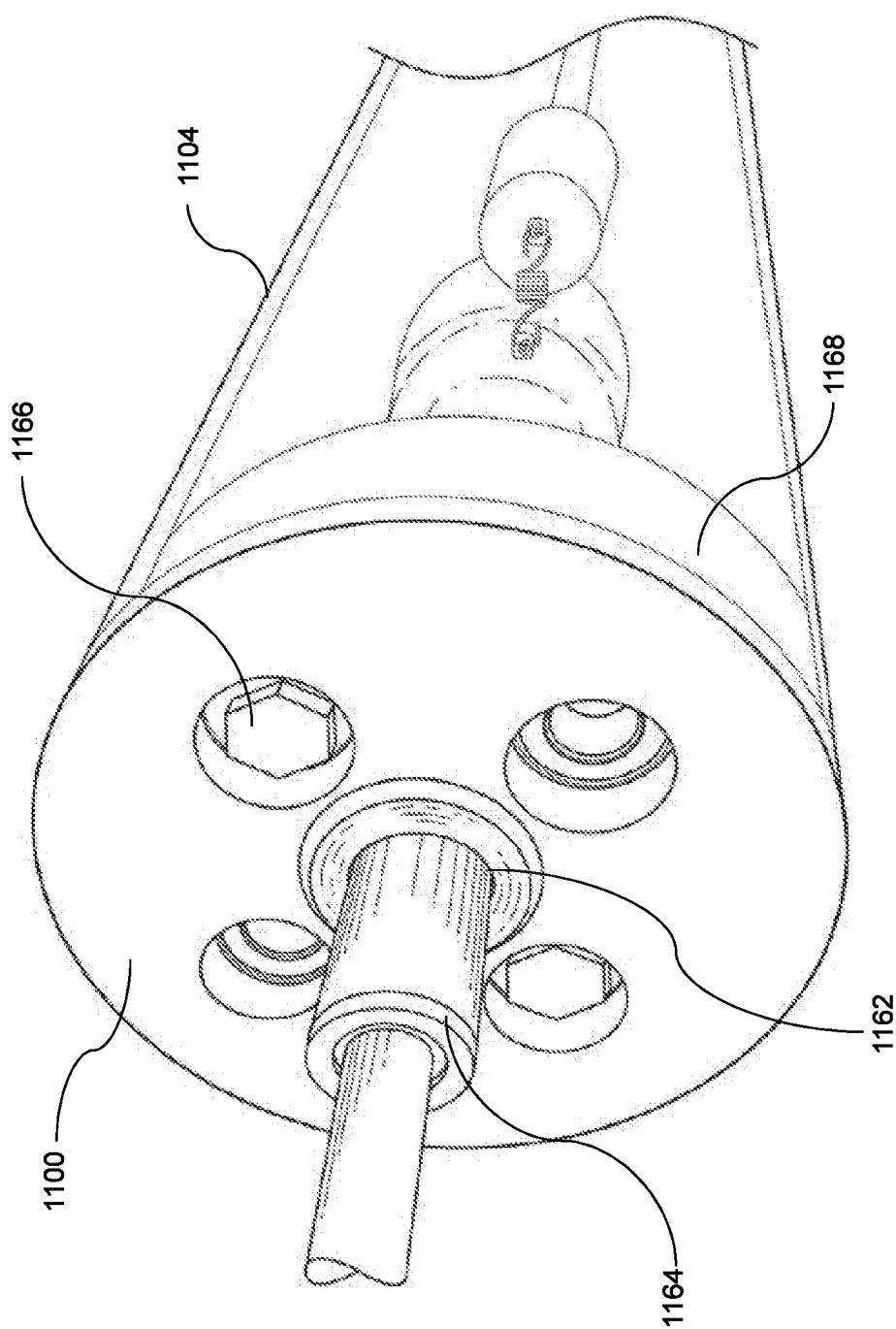
FIG. 11 illustrates an end cap, in accordance with a representative embodiment.
Figure 13:
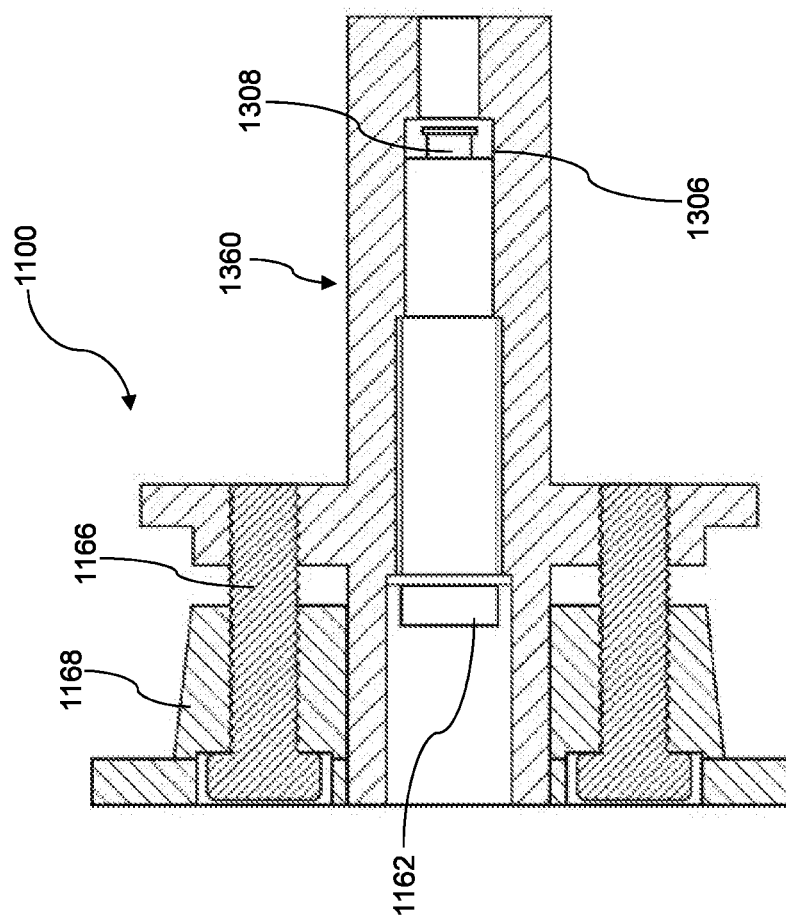
FIG. 13 illustrates a cross-sectional view of an end cap, in accordance with a representative embodiment.
Figure 12:
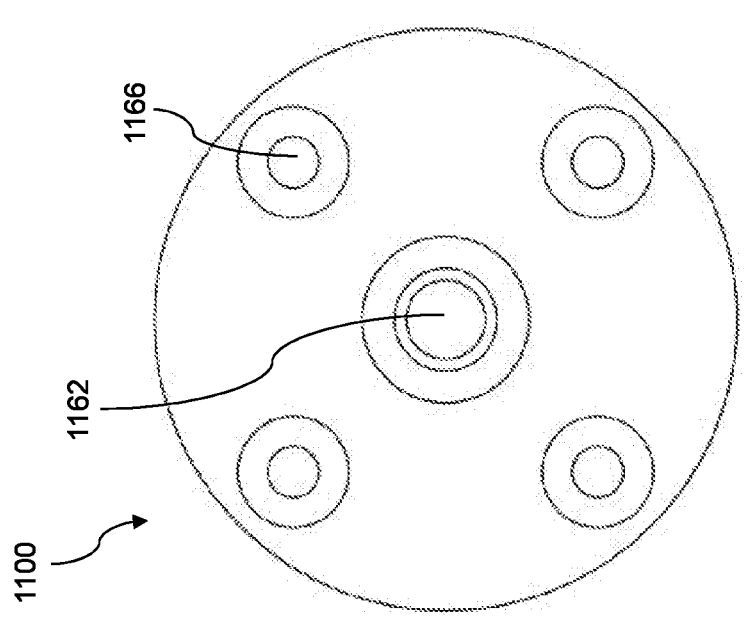
FIG. 12 illustrates a top view of an end cap, in accordance with a representative embodiment.

FIG. 11 illustrates an end cap 1100, in accordance with a representative embodiment. Further, FIG. 12 illustrates a top view of the end cap 1100, and FIG. 13 illustrates a cross-sectional view of the end cap 1100, in accordance with representative embodiments. The end cap 1100 may be structurally configured to engage with an end of a conduit 1104, where the end cap 1100 is actuatable to seal or lock the end of the conduit 1104. The end cap 1100 may include an activator 1162 and one or more sealing lugs 1166, as best shown in FIGS. 11 and 12. Further, systems described herein may include an activator tool 1164 for engagement with the activator 1162. Also, as stated above, the actuator 1360 may be at least partially contained on the end cap 1100—e.g., the end cap 1100 may include a hydraulic cylinder 1306 with a piston 1308 disposed therein as best shown in FIG. 13.

As shown in the FIGS. 11-13, the actuator 1360 may include a hydraulic piston 1308 contained within a hydraulic cylinder 1306. The activator 1162 may be in cooperation with the hydraulic piston 1306, where the activator 1162 is operable to move the hydraulic piston 1306, thereby moving fluid in a hydraulic system, e.g., for locking and unlocking conduit locking devices as described herein.

The activator tool 1164 may be structurally configured to engage and actuate the activator 1162. In some implementations, the activator 1162 is specifically configured such that it can only be activated using certain tools. Thus, the activator tool 1164 may include a key to cooperate with the activator 1162—e.g., a mechanical, electrical, or computer-activated key. In certain implementations, the activator tool 1164 may include a ratcheting device, such as one specifically configured to turn the activator 1162 thereby moving the hydraulic piston 1306 of the actuator 1360. The activator tool 1164 may include a key for cooperation with the activator 1162, where the key is specifically configured for cooperation with the activator 1162. The activator 1162 may cooperate with a hydraulic cylinder 1306 for actuation thereof. For example, the activator 1162 may be rotated, where such rotation moves a hydraulic piston 1308 within the hydraulic cylinder 1306 thereby displacing hydraulic fluid disposed therein for actuating one or more of the conduit locking devices, which may be in communication with the hydraulic cylinder 1306 through tubing or the like.

Thus, the end cap 1100 may include a hydraulic cylinder 1306, which may be in fluid communication with an end of a hydraulic hose or similar. In this manner, the hydraulic cylinder 1306 may be actuatable to move fluid into and out of a hose, i.e., via movement of a piston 1308 that is movably disposed within the hydraulic cylinder 1306. And, as described above, the activator 1162 may be engaged with an outer surface of the end cap 1100, where movement of the activator 1162 provides corresponding movement of the piston 1308 within the hydraulic cylinder 1306. Further, the activator 1162 may include one or more mechanical features such that the activator 1162 is mechanically encoded or keyed for a specific (e.g., unique) activator tool 1164. This may prevent or mitigate tampering by unauthorized individuals.

As stated above, the end cap 1100 may be lockable and sealable on the end of a conduit 1104. To this end, the end cap 1100 may include sealing lugs 1166 or the like that can expand and contract a seal 1168 that engages with an inner diameter of the conduit 1104. This can assist in providing tamper prevention for the conduit 1104. The seal 1168 may be expandable through tightening of one or more of the sealing lugs 1166, and collapsible through loosening of one or more of the sealing lugs 1166. Thus, the seal 1168 may be able to move to form a compression seal with the conduit 1104. This may keep unwanted material from entering or exiting the conduit 1104. The end cap 1100 may also include one or more holes therethrough for allowing the passage of cabling and the like.

Figure 14:
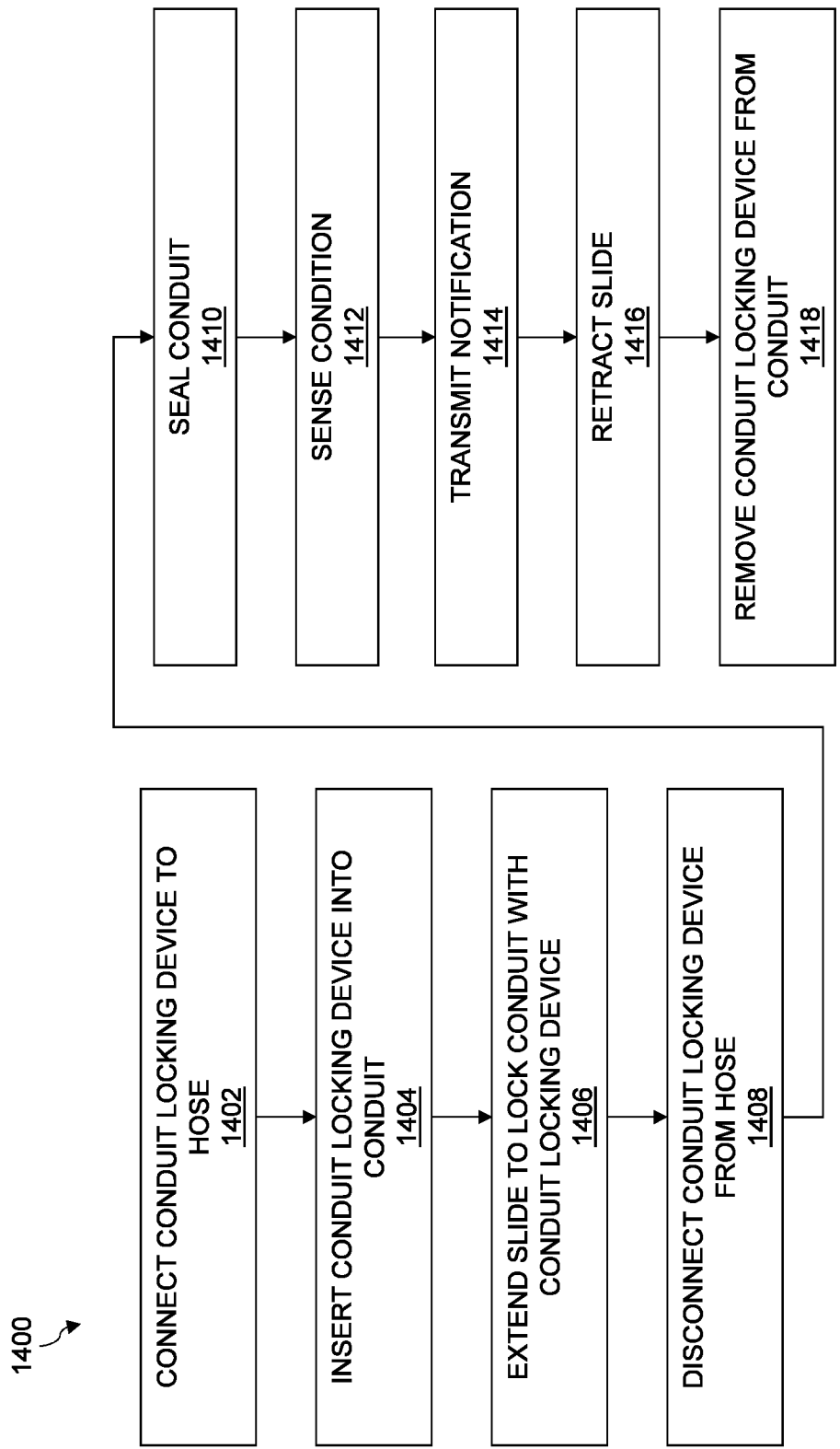
FIG. 14 is a flow chart of a method for locking a conduit, in accordance with a representative embodiment.

FIG. 14 is a flow chart of a method for locking a conduit, in accordance with a representative embodiment. The method 1400 may include the use of any of the devices (e.g., conduit locking devices) and systems described herein.

As shown in block 1402, the method 1400 may include connecting a conduit locking device to a hose. The conduit locking device may be any as described herein. For example, the conduit locking device may include a housing having a first end, a second end, and one or more sidewalls disposed between the first end and the second end. The conduit locking device may also include a connector on one or more of the first end and the second end of the housing, where connecting the conduit locking device to the hose includes engaging the connector with a second connector disposed on the hose. The conduit locking device may further include one or more slides engaged with a sidewall of the housing, where at least one of the slides includes an end portion structurally configured to engage with an inner wall of the conduit and an extension arm, where the slide is extendable via the extension arm from a first position substantially adjacent to a sidewall of the housing to a second position disposed away from the sidewall of the housing. The conduit locking device may also include a fluid chamber within the housing, where the extension arm includes a piston extending through the sidewall of the housing and into the fluid chamber. The connector may include a fluid pathway between the fluid chamber and an external environment, where the fluid pathway includes a valve or the like that permits fluid to be moved into the fluid chamber to pressurize the fluid chamber during a locking operation, and where the valve permits fluid to be moved out of the fluid chamber during a releasing operation thereby depressurizing the fluid chamber.

As shown in block 1404, the method 1400 may include inserting the conduit locking device into the conduit. Inserting the conduit locking device into the conduit may include manually moving the conduit locking device through the conduit. The method 1400 may further include inserting one or more additional conduit locking devices into the conduit.

As shown in block 1406, the method 1400 may include extending a slide of the conduit locking device. This may be accomplished by pressurizing the fluid chamber thereby extending the slide from the first position to the second position to lock the conduit.

As described herein, the hose may include a first hose end and a second hose end. The first hose end may include the second connector, where the second hose end is connected to an actuator. Thus, pressurizing the fluid chamber may include activating the actuator to move fluid through the hose and into the fluid chamber of the conduit locking device.

As shown in block 1408, the method 1400 may include disconnecting the conduit locking device from the hose and removing the hose from the conduit. Thus, in some implementations, conduit locking devices may be installed in a conduit, locked in place (e.g., by extending a hydraulic arm or slide of the conduit locking device by moving fluid from a hose into a fluid chamber of the conduit locking device), and then the component(s) used to install and lock the conduit locking device may be removed from the conduit. Alternatively, some or all of the component(s) used to install and lock the conduit locking device may remain in the conduit while the conduit locking device or system is in use.

As shown in block 1410, the method 1400 may include sealing the conduit. This may include the use of an end cap as described herein. It will be understood that "sealing the conduit" in this context may include preventing or limiting encroachment or access into the conduit by unwanted persons, components, or equipment. Thus, in certain implementations, an end cap may be installed on the end of a conduit (or otherwise within the conduit), and then the end cap may be locked in place. This can be accomplished through the use of a special tool that engages the end cap to the walls of the conduit (e.g., the inner or outer walls of the conduit).

As shown in block 1412, the method 1400 may include sensing a condition of interest related to the conduit. For example, the condition of interest may be related to a presence or absence of an object or substance, a breach or unauthorized access of the conduit, a pressure change, an acoustic event, a temperature change, a humidity change, an applied force or shock, a movement, a leak, and so on. The condition of interest may thus relate to security or safety.

As shown in block 1414, the method 1400 may include transmitting a notification to a user regarding the condition of interest. The notification may be sent to a computing device such as a user's mobile device. The notification may also or instead be transmitted to a control panel, graphical user interface, and so on.

As shown in block 1416, the method 1400 may include retracting a slide of the conduit locking device. This may include releasing pressure from the conduit locking device thereby retracting a slide from the second position to the first position as described herein. Releasing pressure from the conduit locking device may include receiving fluid into a hose (or other hydraulic component) from the fluid chamber of the conduit locking device.

As shown in block 1418, the method 1400 may include removing the conduit locking device from the conduit.

In general, the conduit locking devices described herein may be hydraulically activated and deactivated for locking a conduit. The conduit locking devices may include, or may be in communication with, one or more sensors for monitoring a status of one or more of the conduit locking devices themselves, the conduit, and cables included therein. Because there may be a plurality of conduit locking devices included in a system, the conduit may be monitored in a plurality of locations or over one or more distances.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A system for locking a conduit, comprising:
a conduit locking device comprising:
a housing comprising a first end, a second end, and one or more sidewalls disposed between the first end and the second end;
a first connector on one or more of the first end and the second end of the housing;
one or more slides engaged with the one or more sidewalls of the housing, at least one of the one or more slides comprising an end portion structurally configured to engage with an inner wall of a conduit and an extension arm, the at least one of the one or more slides extendable via the extension arm from a first position substantially adjacent to the one or more sidewalls of the housing to a second position disposed away from the one or more sidewalls of the housing, where, when in the second position, the at least one of the one or more slides is configured to retain the conduit locking device at a fixed position within the conduit through the engagement of the end portion with the inner wall of the conduit; and
a fluid chamber within the housing, the extension arm comprising a piston extending through at least one of the one or more sidewalls of the housing and into the fluid chamber, and the first connector comprising a fluid pathway between the fluid chamber and an external environment, the fluid pathway comprising a valve permitting fluid to be moved into the fluid chamber during a locking operation to pressurize the fluid chamber thereby extending the at least one of the one or more slides from the first position to the second position, and the valve permitting fluid to be moved out of the fluid chamber during a releasing operation thereby depressurizing the fluid chamber and retracting the at least one of the one or more slides from the second position to the first position; and
a hydraulic system coupled to the conduit locking device, the hydraulic system comprising:
a hose having a first hose end and a second hose end, the first hose end comprising a second connector structurally configured for engagement with the first connector of the conduit locking device; and
an actuator engaged to the second hose end, the actuator selectively activatable to perform one or more of:
dispersing fluid through the hose and into the fluid chamber of the conduit locking device when the hose is connected to the conduit locking device, and
receiving fluid into the hose from the fluid chamber of the conduit locking device when the hose is connected to the conduit locking device.

2. The system of claim 1, where the hose is structurally configured to insert the conduit locking device within the conduit.

3. The system of claim 1, where the hose is structurally configured to extract the conduit locking device from the conduit.

4. The system of claim 1, further comprising a releasing element structurally configured to disconnect the first connector and the second connector, the releasing element disposed on one or more of the first connector and the second connector.

5. The system of claim 1, further comprising an extraction tool connected the first connector and the second connector.

6. The system of claim 5, where the extraction tool is structurally configured to extract the conduit locking device from the conduit.

7. The system of claim 6, where the extraction tool comprises a second fluid chamber in fluid communication with a valve to transfer fluid from the fluid chamber of the conduit locking device to the second fluid chamber of the extraction tool thereby depressurizing the fluid chamber of the conduit locking device.

8. The system of claim 1, where the first connector is disposed within a countersunk hole on one or more of the first end and the second end of the housing.

9. The system of claim 8, where the second connector comprises a beveled end.

10. The system of claim 1, where the actuator comprises one or more of a hydraulic cylinder and a pump.

11. The system of claim 10, where the actuator comprises a manual fluid pump.

12. The system of claim 11, where activating the manual fluid pump comprises movement of a lever.

13. The system of claim 1, where the actuator comprises a pressure gauge.

14. The system of claim 1, further comprising an end cap structurally configured to engage with an end of the conduit.

15. The system of claim 14, where the end cap is actuatable to seal the end of the conduit.

16. The system of claim 14, where the end cap is lockable on the end of the conduit.

17. The system of claim 14, where the actuator is at least partially contained on the end cap.

18. The system of claim 17, where the end cap comprises a hydraulic cylinder in fluid communication with the second hose end, the hydraulic cylinder actuatable to move fluid into and out of the hose.

19. The system of claim 18, further comprising a piston movably disposed within the hydraulic cylinder.

20. The system of claim 19, further comprising an activator engaged with an outer surface of the end cap, where movement of the activator provides corresponding movement of the piston within the hydraulic cylinder.

21. The system of claim 20, where the activator comprises one or more mechanical features such that the activator is mechanically encoded or keyed for an activator tool.

22. The system of claim 21, further comprising the activator tool.

23. The system of claim 1, further comprising one or more sensors disposed on at least one of the conduit locking device, the hydraulic system, and the conduit, the one or more sensors in communication with a controller.

24. The system of claim 23, where the one or more sensors comprise at least one of a pressure sensor and a shock sensor.

25. A method for locking a conduit, comprising:
connecting a conduit locking device to a hose, the conduit locking device comprising:
a housing comprising a first end, a second end, and one or more sidewalls disposed between the first end and the second end;
a connector on one or more of the first end and the second end of the housing, where connecting the conduit locking device to the hose comprises engaging the connector with a second connector disposed on the hose;
one or more slides engaged with the one or more sidewalls of the housing, at least one of the one or more slides comprising an end portion structurally configured to engage with an inner wall of a conduit and an extension arm, the at least one of the one or more slides extendable via the extension arm from a first position substantially adjacent to the one or more sidewalls of the housing to a second position disposed away from the one or more sidewalls of the housing; and
a fluid chamber within the housing, the extension arm comprising a piston extending through at least one of the one or more sidewalls of the housing and into the fluid chamber, and the connector comprising a fluid pathway between the fluid chamber and an external environment, the fluid pathway comprising a valve permitting fluid to be moved into the fluid chamber to pressurize the fluid chamber during a locking operation, and the valve permitting fluid to be moved out of the fluid chamber during a releasing operation thereby depressurizing the fluid chamber;
inserting the conduit locking device into the conduit; and
pressurizing the fluid chamber thereby extending the at least one of the one or more slides from the first position to the second position to lock the conduit.

26. The method of claim 25, where the hose comprises a first hose end and a second hose end, the first hose end comprising the second connector and the second hose end connected to an actuator, where pressurizing the fluid chamber comprises activating the actuator to move fluid through the hose and into the fluid chamber of the conduit locking device.

27. The method of claim 25, further comprising disconnecting the conduit locking device from the hose and removing the hose from the conduit.

28. The method of claim 25, further comprising:
releasing pressure from the conduit locking device thereby retracting the at least one of the one or more slides from the second position to the first position; and
removing the conduit locking device from the conduit.

29. The method of claim 28, where releasing pressure from the conduit locking device comprises receiving fluid into the hose from the fluid chamber of the conduit locking device.

30. The method of claim 25, where inserting the conduit locking device into the conduit comprises manually moving the conduit locking device through the conduit.

31. The method of claim 25, further comprising inserting one or more additional conduit locking devices into the conduit.

32. The method of claim 25, further comprising sensing a condition of interest related to the conduit.

33. The method of claim 32, wherein the condition of interest comprises one or more of a presence or absence of an object or substance, a breach of the conduit, a pressure change, an acoustic event, a temperature change, and a movement.

34. The method of claim 32, further comprising transmitting a notification to a user regarding the condition of interest.

35. The method of claim 25, further comprising sealing the conduit.

36. A system for locking a conduit, comprising:
a conduit locking device comprising:
- a housing comprising a first end, a second end, and one or more sidewalls disposed between the first end and the second end;
- a first connector on one or more of the first end and the second end of the housing;
- a slide engaged with a sidewall of the housing, the slide comprising an end portion structurally configured to engage with an inner wall of a conduit and an extension arm, the slide extendable via the extension arm from a first position substantially adjacent to the sidewall of the housing to a second position disposed away from the sidewall of the housing, where, when in the second position, the slide is configured to retain the conduit locking device at a fixed position within the conduit through the engagement of the end portion with the inner wall of the conduit; and
- a fluid chamber within the housing, the extension arm comprising a piston extending through the housing and into the fluid chamber, the first connector comprising a fluid pathway into and out of the fluid chamber; and a hydraulic system coupled to the conduit locking device, the hydraulic system comprising:
- a hose having a first hose end and a second hose end, the first hose end engaged with the first connector of the conduit locking device; and
- an actuator engaged to the second hose end, the actuator activatable to perform one or more of:
  - dispersing fluid through the hose and into the fluid chamber of the conduit locking device, and
  - receiving fluid into the hose from the fluid chamber of the conduit locking device.

37. The system of claim 36, where the actuator comprises a hydraulic piston contained within a hydraulic cylinder.

38. The system of claim 37, further comprising an activator in cooperation with the hydraulic piston, the activator operable to move the hydraulic piston.

39. The system of claim 38, further comprising a tool structurally configured to engage and actuate the activator.

40. The system of claim 39, where the tool comprises a key to cooperate with the activator.

41. The system of claim 39, where the tool comprises a ratcheting device.

42. The system of claim 36, further comprising an end cap.

43. The system of claim 42, where the actuator is included on the end cap.

44. The system of claim 42, where the end cap is lockable on an end of the conduit.

* * * * *